(12) United States Patent
Becker

(10) Patent No.: US 11,239,034 B2
(45) Date of Patent: Feb. 1, 2022

(54) ELECTRIC REMOTE DRIVE FOR ACTUATING A SWITCHING DEVICE OF AN ELECTRIC INSTALLATION AND A REMOTE DRIVE ASSEMBLY

(71) Applicant: Bender GmbH & Co. KG, Gruenberg (DE)

(72) Inventor: Matthias Becker, Feldatal (DE)

(73) Assignee: Bender GmbH & Co. KG, Gruenberg (DE)

(*) Notice: Subject to any disclaimer, the term of this patent is extended or adjusted under 35 U.S.C. 154(b) by 0 days.

(21) Appl. No.: 17/001,763

(22) Filed: Aug. 25, 2020

(65) Prior Publication Data
US 2021/0065999 A1   Mar. 4, 2021

(30) Foreign Application Priority Data

Aug. 27, 2019   (DE) .................. 10 2019 122 978.2

(51) Int. Cl.
| | |
|---|---|
| *H01H 3/28* | (2006.01) |
| *H01H 21/22* | (2006.01) |
| *H01H 21/36* | (2006.01) |

(52) U.S. Cl.
CPC .............. *H01H 3/28* (2013.01); *H01H 21/22* (2013.01); *H01H 21/36* (2013.01)

(58) Field of Classification Search
CPC .......... H01H 3/28; H01H 21/22; H01H 21/36; H01H 3/02; H01H 75/00; H01H 9/26; H01H 9/02; H01H 9/20
USPC .............. 200/335, 50.33, 50.35; 335/14, 172
See application file for complete search history.

(56) References Cited

U.S. PATENT DOCUMENTS

| | | | |
|---|---|---|---|
| 3,893,050 A | 7/1975 | Salvati et al. | |
| 6,531,938 B1 | 3/2003 | Smith et al. | |
| 2009/0078550 A1* | 3/2009 | Lament | ............ H01H 9/26 200/335 |
| 2014/0354380 A1* | 12/2014 | Fasano | ............ H01H 71/12 335/1 |

FOREIGN PATENT DOCUMENTS

| | | |
|---|---|---|
| CN | 106409545 A | 2/2017 |
| CN | 205920886 U | 2/2017 |
| DE | 69834859 T2 | 12/2006 |
| WO | 2019073222 A1 | 4/2019 |

* cited by examiner

*Primary Examiner* — Edwin A. Leon
*Assistant Examiner* — Iman Malakooti
(74) *Attorney, Agent, or Firm* — Dickinson Wright PLLC; Andrew D. Dorisio

(57) ABSTRACT

A remote drive with a support element for a top-hat-rail mounting. Opposing actuators disposed on the support element alternatingly act on a displaceably mounted slider by rod-shaped anchors. A slider passage receives a first lever arm of a rocker lever pivotable about a rotational axis parallel to the top hat rail length and nearly passes through a rotational point of a shift lever of a switching device. A carrier rail on a second lever arm is parallel to the top hat rail length, the shift lever engaging the carrier rail to the side of the second lever arm. When the slider is displaced, the rocker lever flips simultaneously activate the shift lever. In a remote drive assembly, two remote drives are disposed adjacent to one another on a top hat rail with a locking mechanism. Alternatively, individually controlled actuators act on first and second legs of a T-shaped rocker switch.

9 Claims, 3 Drawing Sheets

ELECTRIC REMOTE DRIVE FOR ACTUATING A SWITCHING DEVICE OF AN ELECTRIC INSTALLATION AND A REMOTE DRIVE ASSEMBLY

This application claims priority to German Patent Application No. 10 2019 122 978.2, filed on Aug. 27, 2019, the disclosure of which is incorporated herein by reference.

FIELD OF THE INVENTION

The invention relates to an electric remote drive for actuating a switching device of an electric installation mounted on a top hat rail and to a remote drive assembly.

BACKGROUND OF THE INVENTION

A safe and reliable power supply forms the basis for a hassle-free and economic operation in the private, public and in particular industrial sector. However, the increasing complexity of electric installations demands sufficient protective measures to fulfill the requirements regarding electric safety and outage safety.

For a standard setup and for monitoring the power supply, the electric installation is provided with switching devices, such as an over-current protective device, circuit breakers or load disconnectors.

With regard to the availability of installations and their electric safety, the option of still being able to control the electric installation must also be available if a part of the power supply, such as during an outage of the subnetwork, is no longer warranted.

Owing to the isolated setup between the switching device on the one hand and a drive for the switching device on the other hand, the switching device can be switched by means of a drive (remote drive) driven remotely in conjunction with an independent and remotely available power source.

In particular when it comes to the use in the medical field, further requirements regarding the power supply system are imposed in the standard VDE 0100-710 which surpass insulation monitoring. Thus, switchover times of less than 500 ms are to be fulfilled during a voltage outage, for example.

From the state of the art, remote drives for switch controlling are known which are based on electric motors as actuators, but which do not fulfill the required standard switch times. Furthermore, remote drives are available which do comprise actuators controlled by electromagnets, but are merely controlled by only one control voltage source and thus do not ensure the required outage safety. Moreover, quickly switching remote drives are also known which operate with a spring brake or an electromagnet; these, however, are mechanically very sophisticated and are unsuitable for being mounted on a top hat rail due to their size.

Object and Summary of the Invention

The object of the invention at hand is therefore to construct an electric remote drive for a switching device which is mounted on a top hat rail, is compact and simply configured, has standard and quick switch times and can be supplied with energy by at least two independent energy sources.

This object is attained by an electric remote drive for actuating a switching device of an electric installation mounted on a top hat rail as disclosed.

The remote drive according to the invention comprises a support element which is configured for a standard mounting on a top hat rail. As an additional function, the remote drive can therefore be mounted directly adjacent to the switching device to be actuated.

On the support element, two opposing actuators realized as electron magnets are disposed which alternatingly act on a displaceably mounted slider by means of their respective rod-shaped anchors. The slider comprises a passage in its center for receiving a first lever arm of a rocker lever. The rocker lever is pivotable about a rocker-lever rotational axis which extends parallel to the long side of the top hat rail and passes at least nearly through a rotational point of a shift lever of the switching device to be actuated. On a second lever arm of the rocker lever, a carrier rail is disposed parallel to the long side of the top hat rail, the shift lever of the switching device engaging into the carrier rail to the side of the second lever arm. When the slider is displaced due to the electromagnet being actuated, the rocker lever is flipped whereby the shift lever of the switching device is simultaneously actuated.

Since the two actuators which are controllable individually are galvanically isolated, they can be supplied with energy from two power supply networks which are independent from each other. Moreover, the electromagnets work quickly and consequently enable short standard switch times. The electromagnets are preferably realized as traction magnets.

With regard to another advantageous embodiment, the carrier rail is U-shaped.

The U-shaped profile ensures sufficient stability, the torsional stiffness of the carrier rail ensuring an exact transfer of force to the shift lever.

Furthermore, the carrier rail is mounted in a radially displaceable manner for adjustment to the movement of the shift lever.

To guarantee a reliable interaction of the remote drive with various switching devices, the carrier rail is mounted in a radially displaceable manner so that this mechanical adjustment ensures carrying the shift lever with as little play as possible.

Preferably, the carrier rail has a sufficient length so that it is possible to actuate several switching devices mounted adjacent to each other on the top hat rail.

The remote drive according to the invention is consequently suitable for simultaneously switching several switching devices disposed adjacent to each other on the top hat rail.

Furthermore, the support element can comprise a detachable top-hat-rail clip for more easily mounting the top hat rail. Thus, a fast mounting on a standard top hat rail is possible in a 45 mm cutout, for example.

With a remote drive assembly, two remote drives according to the invention can be disposed adjacent to each other on a top hat rail and be provided with a locking mechanism. By locking one of the two sliders when moving the other slider, starting up both remote drives at the same time is prevented.

When using two remote drives and two switching devices with the locking mechanism according to the invention, the requirement is consequently fulfilled that it should not be possible to interconnect two circuits for realizing a main switch according to standard IEC 60947-6-1.

In particular in conjunction with two switching devices which, for example, form a switch device for alternatingly interconnecting or disconnecting or entirely isolating two power supply networks, does the remote drive assembly according to the invention prove to be a reliable and compact solution.

In another embodiment of the locking mechanism, the locking mechanism in conjunction with the remote drive realized as a slider comprises a locking element in the shape of a rectangular angle profile, which is rotatable about a locking rotational axis rectangular to the plane of the top hat rail. When displacing one of the sliders from the OFF position to the ON position, a front surface of the slider bumps against one of the lateral surfaces of the angle profile in the process and rotates the angle profile so far that a movement of the other slider into the ON position is blocked by the other lateral surface of the angle profile abutting against a front surface of the other slider.

By blocking the respective remote drive, it is ensured that the remote drives do not simultaneously switch on the respective actuated switching device.

Advantageously, the locking mechanism can be configured as an independent structural unit for being mounted on a top hat rail, this structural unit consisting of a frame part for being mounted on a top hat rail to which the locking element having a locking rotational axis is fastened.

In this embodiment, the locking mechanism can be integrated into an existing configuration of remote drives and switch units on a top hat rail as an independent structural unit.

The object of the invention is alternatively attained by an electric remote drive according to the invention which comprises a support element configured for a standard top-hat-rail mounting and having two actuators which can be controlled individually and each act on a first and a second leg of a T-shaped rocker switch as electromagnets. In this context, the rocker switch comprises a third leg formed rectangular to the first and the second leg in the rotational point, a carrier rail being mounted parallel to the long side of the top hat rail on the end of the third leg, a shift lever of the switching device engaging into the carrier rail to the side of the third leg, the rocker lever being pivotable about a rocker-lever rotational axis which extends parallel to the long side of the top hat rail and passes through a rotational point of the shift lever.

Alternatively to the solution described in the introduction, in which two opposing electromagnets act on a displaceably mounted slider, the embodiment described in this instance is based on two electromagnets which each act on one end of a rocker switch and consequently actuate the shift lever via a third leg formed in the center of the rocker switch.

BRIEF DESCRIPTION OF THE FIGURES

Further advantageous embodiment features are derived from the following description and the drawings which describe preferred embodiments of the invention using an example.

In the figures,

FIG. 4 is a schematic view showing the locking element mounted on the top hat rail.

DETAILED DESCRIPTION

Figure 1:
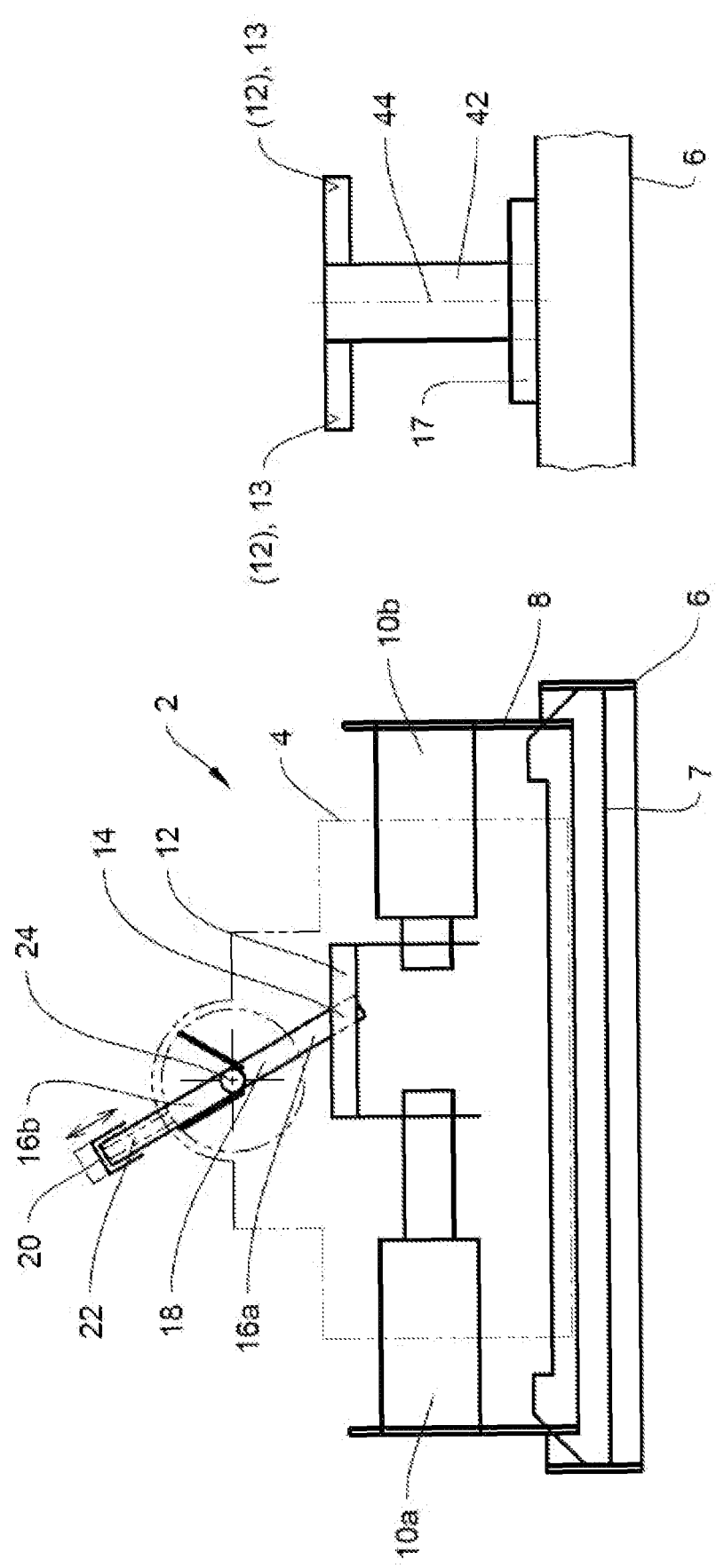
FIG. 1 is a schematic view of a first embodiment of the remote drive according to the invention (type slider)

FIG. 1 is a schematic view of a first embodiment (type slider) of remote drive 2 according to the invention. Two opposing actuators 10a, 10b are disposed on a support (element) 8 which can be designed as a supporting frame or a mounting/base plate and which is fastened to a top hat rail 6 or can be mounted via a top-hat-rail clip 7. The actuators 10a, 10b alternatingly acting on a displaceably mounted slider 12 as traction magnets by means of their rod-shaped anchors.

Slider 12 comprises a passage 14 through which a first lever arm 16a of a rocker lever 18 is passed. Rocker lever 18 is mounted in a rocker-lever rotational axis 24 which is oriented parallel to the long side of top hat rail 6 and whose rotational point nearly completely coincides with the rotational point of a shift lever 22 of switching device 4. A carrier rail 20 is disposed parallel to the long side of top hat rail 6 on an end of a second lever arm 16b of rocker lever 18. Shift lever 22 of switching device 4 engages into carrier rail 20 and is actuated upon pivoting rocker lever 18.

Figure 2:
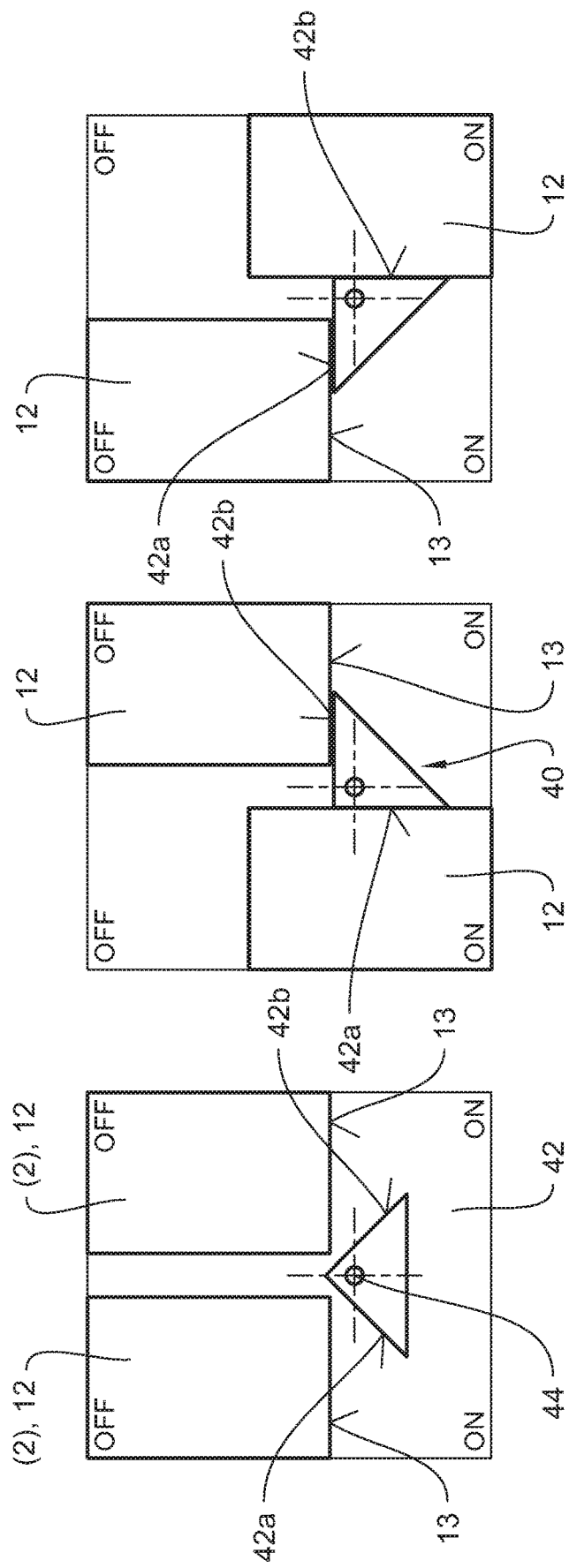
FIGS. 2a, 2b, 2c are a schematic view of the functionality of a remote drive assembly according to the invention having a locking mechanism for the type slider.

In FIGS. 2a, 2b, 2c, the functionality of a remote drive assembly according to the invention is schematically shown having two adjacent remote drives 2 and a locking mechanism 40. Locking mechanism 40 comprises a locking element 42 between sliders 12 of remove drives 2, locking element 42 being realized as a rectangular isosceles angle profile 42, for example as a triangular rod section, and being mounted so as to be rotatable about a locking rotational axis 44.

Starting from the OFF position of both sliders 12 in FIG. 2a, a front surface 13 of one of the sliders 12 bumps against a lateral surface 42a of locking mechanism 42 upon being moved into the ON position. Due to this, locking element 42 rotates and blocks a downward movement (movement for switching on) of other slider 12 by means of its other lateral surface 42b (FIG. 2b, 2c).

Figure 3:
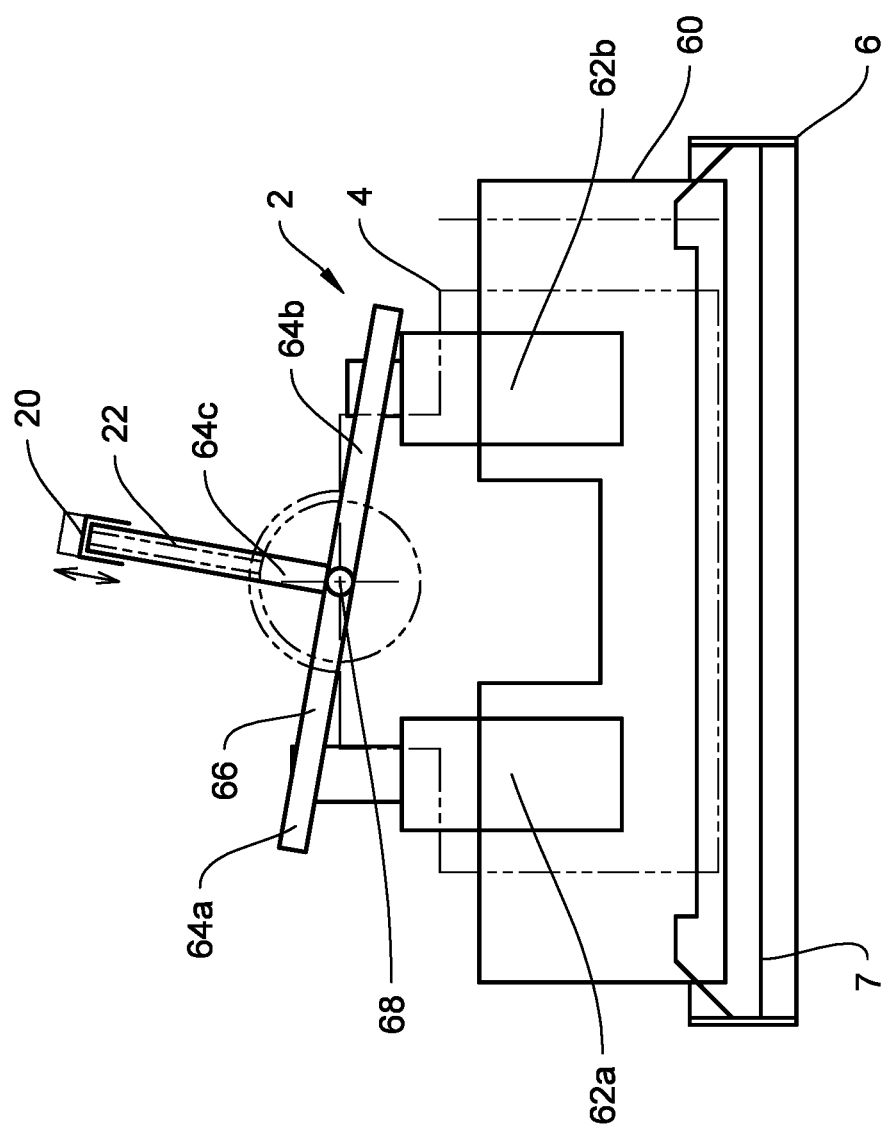
FIG. 3 is a schematic view of a second embodiment of the remote drive according to the invention (type rocker switch).

In FIG. 3, a second embodiment (type rocker switch) of remote drive 2 according to the invention is shown. In this embodiment, electron magnets 62a and 62b act on a first leg 64a and on a second leg 64b, respectively, of a rocker switch 66. Rocker switch 66 comprises a third leg 64c formed in the center rectangular to first and second leg 64a, 64b, a carrier rail 20 being fastened to the end of third leg 64c, shift lever 22 of switching device 4 engaging into carrier rail 20. A rocker-switch rotational axis 68 extends parallel to the long side of top hat rail 6, the rotational point being almost in the rotational point of shift lever 22.

FIG. 4 shows the rectangular profile of the locking element 42 with its locking rotational axis 44 being mounted on the top hat rail 6 by a frame part 17.

The invention claimed is:

1. An electric remote drive (2) for actuating a switching device (4) of a electric installation mounted on a top hat rail (6), the electric remote drive (2) comprising:
 a support (8) configured for a standard top-hat-rail mounting and having two actuators (10a, 10b) which can be controlled individually and alternatingly act on a displaceably mounted slider (12) as opposing electromagnets (10a, 10b), the slider (12) having a passage (14) for receiving a first lever arm (16a) of a rocker lever (18), and a carrier rail (20) being mounted parallel to a long side of the top hat rail (6) on a second lever arm (16b) of the rocker lever (18), a shift lever (22) of the switching device (4) engaging into the carrier rail (20) laterally of the second lever arm (16b), the rocker lever (18) being pivotable about a rocker-lever rotational axis (24) which extends parallel to the long side of the top hat rail (6) and passes through, a rotational point of the shift lever (22).

2. The electric remote drive according to claim 1, wherein the carrier rail (20) is U-shaped.

3. The electric remote drive according to claim 1, wherein the carrier rail (20) is mounted in a radially displaceable manner for adjustment to a movement of the shift lever (22).

4. The electric remote drive according to claim 1, wherein the carrier rail (20) has such a length that actuating several adjacently mounted switching devices (4) on the top hat rail (6) is possible.

5. The electric remote drive according to claim 1, wherein the support (8) comprises a detachable top-hat-rail clip (7) for mounting the top hat rail.

6. A remote drive assembly having a first and a second remote drive (2) disposed adjacent to one another on a top hat rail (6), comprising:
- a support element (8) configured for mounting on the top hat rail and having two actuators (10a, 10b) which can be controlled individually and alternatingly act on a displaceably mounted slider (12) as opposing electromagnets (10a, 10b), the slider (12) having a passage (14) for receiving a first lever arm (16a) of a rocker lever (18), and a carrier rail (20) being mounted parallel to a long side of the top hat rail (6) on a second lever arm (16b) of the rocker lever (18), a shift lever (22) of the switching device (4) engaging into the carrier rail (20) laterally of the second lever arm (16b), wherein the carrier rail (20) is mounted in a radially displaceable manner for adjustment to the movement of the shift lever (22), the rocker lever (18) being pivotable about a rocker-lever rotational axis (24) which extends parallel to the long side of the top hat rail (6) and passes through a rotational point of the shift lever (22); and
- a locking mechanism (40) which prevents a simultaneous start-up of both remote drives (2) by locking one of the two sliders (12) via the remaining slider (12).

7. The remote drive assembly according to claim 6, wherein the locking mechanism (40) comprises a locking element (42) in the form of a rectangular angle profile (42) rotatable about a locking rotational axis (44), which is rectangular to a plane of the top hat rail (6), so as to be disposed such that, when displacing one of the sliders (12) from an OFF position to an ON position, a front surface (13) of the slider (12) bumps against a lateral surface (42a) of the angle profile (42) and the angle profile (42) rotates so far that by another lateral surface (42b) of the angle profile (42) abutting against a front surface (13) of the other slider (12) in the OFF position, the other slider (12) is blocked from moving into the ON position.

8. A locking mechanism according to claim 7, further including
- an independent structural unit for being mounted on the top hat rail (6) comprising a frame part for being mounted on the top hat rail (6) to which the locking element (42) having a locking rotational axis (44) is fastened.

9. An electric remote drive (2) for actuating a switching device (4) of an electric installation mounted on a top hat rail (6), the electric remote drive (2) comprising:
- a support (60) configured for a top-hat-rail mounting and having two actuators (62a, 62b) which can be controlled individually a first actuator in the form of an electromagnet (62a) for acting on a first leg (64a) and a second actuator in the form of an electromagnet (62b) for acting on a second leg (64b), the rocker switch (66) comprising a third leg (64c) formed in the center rectangular to the first and the second leg, and a carrier rail (20) being mounted parallel to a long side of the top hat rail (6) on an end of the third leg (64c), a shift lever (22) of the switching device (4) engaging into the carrier rail (20) to laterally of the third leg (64c), the rocker lever (66) being pivotable about a rocker-lever rotational axis (68) which extends parallel to the long side of the top hat rail (6) and passes through a rotational point of the shift lever (22).

\* \* \* \* \*

UNITED STATES PATENT AND TRADEMARK OFFICE
CERTIFICATE OF CORRECTION

PATENT NO. : 11,239,034 B2
APPLICATION NO. : 17/001763
DATED : February 1, 2022
INVENTOR(S) : Matthias Becker It is certified that error appears in the above-identified patent and that said Letters Patent is hereby corrected as shown below:

In the Claims

Column 4, Claim 1, Line 51 - please replace "a" with --- an ---

Column 4, Claim 1, Line 67 - please replace "passes through," with --- passes through ---

Column 6, Claim 9, Line 24 - please replace "trolled individually a first actuator" with --- trolled individually and a first actuator ---

Signed and Sealed this
Twelfth Day of July, 2022

Katherine Kelly Vidal
*Director of the United States Patent and Trademark Office*